UNITED STATES PATENT OFFICE.

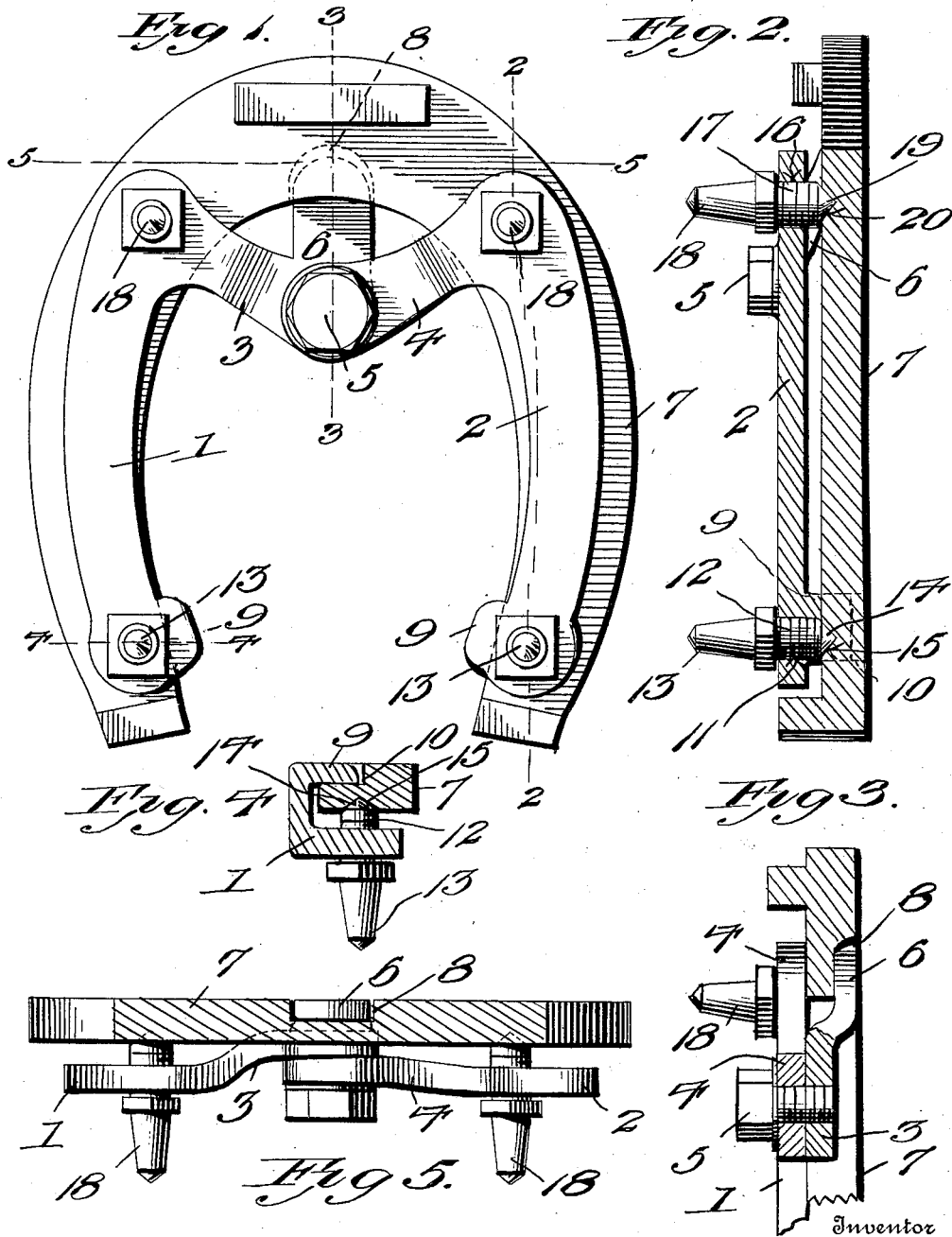

HARRY L. RILEY, OF ATLANTIC CITY, NEW JERSEY.

ICE-CREEPER FOR HORSESHOES.

1,057,880.  Specification of Letters Patent.  Patented Apr. 1, 1913.

Application filed February 24, 1912. Serial No. 679,554.

*To all whom it may concern:*

Be it known that I, HARRY L. RILEY, a citizen of the United States, residing at Atlantic City, in the county of Atlantic and State of New Jersey, have invented new and useful Improvements in Ice-Creepers for Horseshoes, of which the following is a specification.

The present invention relates to ice creepers for horses.

In carrying out my invention it is my purpose to provide an ice creeper which may be adjusted to fit various sizes of horse shoes and which is provided with shoe engaging elements adapted to be arranged upon the upper face of the horse shoe and to act in conjunction with the cone-shaped extensions upon the threaded portions of calks for effectively sustaining the creeper upon the horse shoe.

It is also my purpose to provide an adjustable creeper of this class which shall be spaced a distance away from the shoe to which it is attached to permit of the passage of snow or mud between the attachment and the shoe.

A still further object of the invention is to provide a device of this class which may be easily and quickly attached to a horse shoe or removed therefrom as desired.

With the foregoing objects in view and others of a similar nature which will be apparent as the nature of the invention is developed, the improvement resides in the novel construction, combination and arrangement of parts set forth in and falling within the scope of the appended claim.

In the drawing, Figure 1 is a bottom plan view illustrating the device in applied position upon a horse shoe. Fig. 2 is a sectional view upon the line 2—2 of Fig. 1. Fig. 3 is a sectional view upon the line 3—3 of Fig. 1. Fig. 4 is a sectional view upon the line 4—4 of Fig. 1. Fig. 5 is a sectional view upon the line 5—5 of Fig. 1.

As illustrated in the drawings the improved ice creeper for horse shoes comprises a pair of sections or members which are designated by the numerals 1 and 2. Each of these members is substantially L-shaped in plan and the shorter or offset arms which are designated by the numerals 3 and 4, have their ends pivotally connected as at 5. The offset arm 3 of the member 1 is curved upwardly and over the arm 4 of the member 2, and the said curved member 3 is integrally formed with an extending tongue 6. The upper face of the shoe 7 at the toe thereof is recessed to provide a pocket 8 within which the tongue 6 is adapted to be received. The heel ends of the members 1 and 2 are provided with overlying lips 9, the said lips adapted to be received within recesses or pockets 10 provided upon the upper face of the shoe 7 at the heel portions thereof. The members 1 and 2 directly opposite the overlying lips 9 are formed with threaded openings 11, and the said openings are adapted to receive the threaded portions 12 of calks 13. The extremities of the threaded portions of the said calks are cone-shaped as designated by the numeral 14, and the under face of the shoe, at the heel portion thereof is reamed as at 15 to receive the said cone-shaped extensions of the calks. The L-shaped members 1 and 2 are provided at the juncture of their arms with threaded openings 16, the said openings being adapted to receive the threaded portions 17 of calks 18. These calks 18 are similar to the calks 13, having the end of their threaded portions provided with cone-shaped extensions 19, and the shoe 7 is reamed to provide cone-shaped depressions 20 within which the portions 19 of the calks 18 are received.

From a construction as above described it will be noted that the members 1 and 2 of the creeper attachment may have their heel portions swung, through the medium of the pivotal connection 5, either toward or away from each other to agree with the various sizes of shoes upon which the device is to be attached, and further that the tongues and lips of the said attachment being arranged upon one of the faces of the shoe and the calks exerting a pressure upon the opposite face of the shoe and being received within the reamed portions or pockets, accidental removal of the device from the shoe is effectively overcome.

Having thus described the invention, what I claim is:—

In combination with a horse shoe having its inner face provided with pockets opening out through the inner edge thereof, one of said pockets being arranged at the center of the toe portion of the shoe, the remaining pockets being arranged one each at the heel portions of the shoe, the lower face of the shoe being provided with cone-shaped depressions, one of which being arranged directly beneath each of the pockets of the heel, the remaining pair of depressions being located one to each of the opposite sides of the toe of the shoe, of a creeper attachment for the shoe, said attachment comprising a pair of elements adapted to underlie the sides of the shoe, each of said elements having its end formed with an angular extension, a screw member for connecting the ends of said extensions, one of said extensions being upset and provided with an extending tongue which is adapted to be received within the pocket of the toe of the shoe, the elements being provided adjacent their opposite ends with upset portions provided with outset flanges which are adapted to be received within the pockets at the heel of the shoe, and rotatable members having cone-shaped extensions threaded through the elements and adapted to engage within the cone-shaped depressions at the heel of the shoe and the depressions arranged below and to the opposite sides of the pocket in the toe of the shoe.

In testimony whereof I affix my signature in presence of two witnesses.

HARRY L. RILEY.

Witnesses:
SYDNEY B. DE LA RUE,
FRANCIS B. BIGGS.

---

Copies of this patent may be obtained for five cents each, by addressing the "Commissioner of Patents, Washington, D. C."